May 9, 1967  J. H. THOMPSON ET AL  3,318,152
TEMPERATURE SENSOR
Filed July 16, 1963

WITNESSES
Theodore F. Wrobel
James F. Young

INVENTORS
Fred G. Geil, John H. Thompson
Dale D. Skinner, Robert H. Whittaker
BY Dean Schron
ATTORNEY

United States Patent Office 3,318,152
Patented May 9, 1967

3,318,152
TEMPERATURE SENSOR
John H. Thompson, Pittsburgh, Dale D. Skinner, Turtle Creek, Robert H. Whittaker, Franklin, and Fred G. Geil, Verona, Pa., assignors to Westinghouse Electric Corporation, Pittsburgh, Pa., a corporation of Pennsylvania
Filed July 16, 1963, Ser. No. 295,393
7 Claims. (Cl. 73—362.8)

This invention in general relates to temperature sensors, and in particular to a highly accurate temperature sensor particularly useful in oceanographic temperature measurements.

In many scientific experiments, it is desirable to know the accurate temperature of an environment, whether it be a solid body or a fluid medium such as encountered in oceanographic temperature measurements. One type of temperature sensor utilizes a quartz crystal as a temperature sensitive resonator in the feedback path of an oscillator circuit. A main problem is obtaining adequate thermal coupling between the fluid medium and the quartz crystal. In order to obtain a highly accurate reading, the Q of the resonator must be extremely high and in the case of a quartz crystal, the coupling medium to the water substantially reduces the Q of the crystal. A secondary problem involved is that the quartz is an extremely poor heat conductor.

Another type of accurate temperature sensor utilizes a thermistor in a Wheatstone bridge circuit arrangement connected to power and sensing apparatus by long lines which may extend to distances over 10 miles. In such an arrangement, the accuracy of the circuit is impaired by the heating of the thermistor in the bridge due to the current in the bridge network. In addition, an extremely large IR drop must be considered in the long lines. Thermistors utilized in a phase shift oscillator require an extremely stable circuit which requires constant calibration, and in most circumstances, is either undesirable or impossible.

It is therefore a primary object of the present invention to provide a highly accurate temperature sensor.

It is another object to provide a temperature sensor which does not need constant calibration.

It is another object to provide an extremely rugged temperature sensor.

It is another object to provide a temperature sensor whose performance is unaffected by long power and signal carrying leads.

It is yet another object to provide a temperature sensor which produces a signal compatible with telemetry and digital conversion equipment.

It is another object to provide an accurate temperature sensor utilizing a flexural mode resonator having a high Q.

It is a further object to provide an accurate temperature sensor utilizing only two leads for both power and output signals.

Briefly, in accordance with the above objects, there is provided accurate temperature measuring apparatus utilizing a flexural mode resonator having two nodal diameters. The resonator is preferably of a high heat conductive material, usually metal, in the form of a disk, and the frequency of oscillation of the resonator is temperature dependent. A high Q resonator results in a higher accuracy system and in order to insure that the resonator maintains a high Q, support means such as a post is located at the intersection of the two nodal diameters thereby eliminating any mechanical loading on the disk. The support means is made integral with the resonator and therefore acts as a medium of heat exchange with the disk. In one embodiment, the resonator is used in the feedback path of an oscillator, the frequency of oscillation of which is governed by the frequency of oscillation of the resonator. Since the resonator has a predetermined frequency-temperature coefficient, it will change its frequency of oscillation in proportion to a change in temperature. D.C. power to the oscillator may be supplied over two long leads, and the output frequency from the oscillator circuit including the resonator may be fed to indication means along these same two lines. The frequency output, which is an indication of the temperature being measured, may be utilized in conjunction with telemetry equipment, or may be fed directly to a counter thereby giving a digital output signal.

The above stated and further objects of the present invention will become apparent upon reading the following detailed specification taken in conjunction with the drawings, in which.

Figure 1:
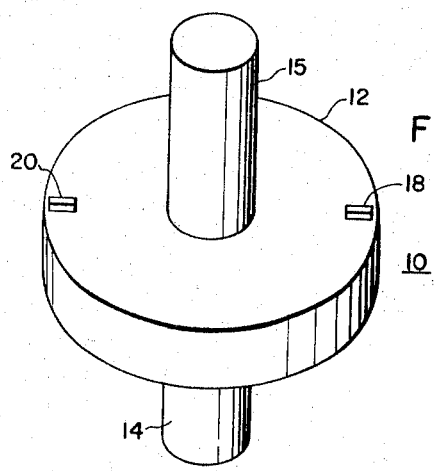
FIGURE 1 illustrates a perspective view of a flexural mode resonator.

Referring now to FIG. 1, there is shown one form of flexural mode resonator which may be utilized herein. The resonator 10 comprises a disk 12 preferably made of a high heat conductive metal such as aluminum. In order to set the resonator 10 into oscillation, driving means 18 may be provided for receiving an input driving signal. A pickup means 20 is additionally provided to produce an output signal indicative of the frequency of oscillation of the flexural mode resonator 10. The driving means 18 and pickup means 20, which may be piezoceramic elements, are bonded to the resonator disk 12 by means of a conducting epoxy. Integral with the resonator 10 is support means 14 which may take the form of a high heat conductive post having a lossless bond with the resonator disk 12, as is the case when a cylindrical piece of metal is machined down to form a first sized cylinder (disk 12) and a second smaller sized cylinder (support post 14). In order to insure better heat transfer to the resonator 10 an additional support post 15 is provided and is similar to support means 14. The resonator 10 includes at least two nodal diameters and vibrates in a flexural mode between the posts 15 and 14. A fuller understanding of the oscillation of the flexural mode disk 12 and the high Q resonator resulting therefrom may be had by referring now to FIG. 2.

Figure 2:
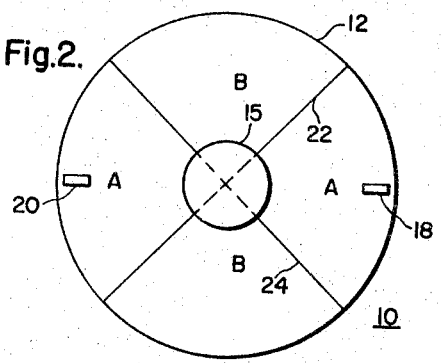
FIG. 2 illustrates a plan view of the resonator shown in FIG. 1.

In FIG. 2 there is shown a plan view of the disk resonator 10 of FIG. 1. The resonator disk 12 includes a first nodal diameter 22 and a second nodal diameter 24 which divides the disk into four equal quadrants labeled A, B, A and B. The support posts 14 and 15 are made integral with the resonator 10 at the intersection of these two nodal diameters. When energy is imparted to the resonator 10, such as by drive element 18, oscillations occur in a manner such that the two A quadrants simultaneously project upward toward the post 15, and the two B quadrants simultaneously project downward toward the post 14. On a different half cycle the two A quadrants will project downward toward post 14 and the two B quadrants will project upward toward the post 15. In order to maintain a high Q, the vibratory forces produced by the resonator 10 must not be loaded down nor be lost through support means and to this end reference is now made to FIG. 3.

Figure 3:
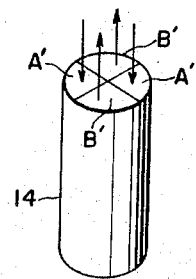
FIG. 3 illustrates a perspective view of one of the support means of the resonator of FIG. 1.

In FIG. 3 there is shown a portion of one of the support posts 14 with the top surface thereof representing the forces at any plane through the post. The principles explained with reference to support post 14 are equally applicable to the other support post 15. As shown in FIG. 3, at one instant of time there are two equal forces projecting downwardly on the two A′ segments. Since the support post 14 is integral with the resonator, this projection force is due to the downward deflection of the two A quadrants of FIG. 2. At the same instant of time, the two B′ segments of support post 14 have two equal forces projecting in an upward direction due to the upward flexing of the two B quadrants of the resonator. Thus at any one instant of time the resultant forces on the support post 14 is substantially zero and no vibratory losses are transmitted through the support posts 14 or 15, an important consideration in maintaining a high Q resonator.

The material of the resonator is chosen to be of high heat conductivity and yet be hard enough to permit a high mechanical Q. The resonant frequency of the resonator is dependent upon the motional compliance or inverse spring stiffness of the resonator. That is, the resonant frequency is principally determined from the disk dimensions and Young's modulus of elasticity. Young's modulus varies as a function of temperature. Therefore, the material of which the resonator 10 is made, has a certain frequency-temperature coefficient. That is, the frequency of oscillation of the resonator 10 is dependent upon temperature, and any change of temperature will change the frequency of oscillation proportionally. The utilization of these factors, that is maintenance of a high Q, and frequency temperature dependency, may be observed with respect to FIG. 4.

Figure 4:
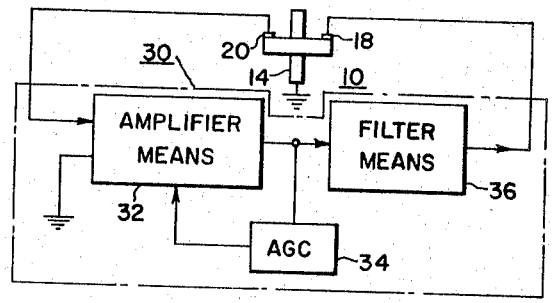
FIG. 4 illustrates a schematic showing of an embodiment of the present invention.

In FIG. 4 there is shown an embodiment of temperature sensing apparatus using the hereinabove described resonator. FIG. 4 illustrates an oscillator circuit with the resonator 10 operatively connected in the feedback path to thereby govern the frequency of the oscillator. The oscillator includes amplifier means 32 operatively connected to the pickup means 20 of the resonator 10. In order to provide proper gain stabilization, there is provided an automatic gain control 34 as is well known to one skilled in the art. The output signal of the oscillator is operatively connected back to the drive means 18 of the resonator 10. The resonator 10 may be thought of as a three terminal network, one terminal being the input means 18, the other terminal being the output means 20, and the third terminal being ground, and the support post 14 is shown as being the grounded element. In some instances, the resonator 10 will oscillate at a frequency other than a predetermined desired frequency, and to this end, filter means 36 are provided for passing only frequencies below a predetermined cutoff point to insure that the resonator 10 oscillates at the fundamental frequency. The amplifier means 32, AGC 34 and filter means 36 have been included in a dotted box given the general numeral designation 30. To more fully understand the operation of the oscillator of FIG. 4 and the desirability of a high Q resonator, reference should now be made to FIG. 5.

Figure 5:
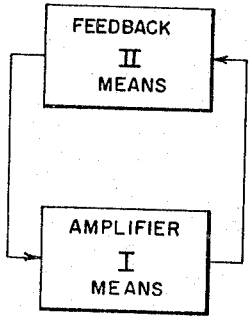
FIG. 5 illustrates a schematic showing of an oscillator to aid in an understanding of the operation of the circuit of FIG. 4.

FIG. 5 illustrates in block diagram form, an oscillator circuit including amplifier means, I, and feedback means, II. For stable oscillations to exist, the loop gain must equal one and the phase shift around the circuit must equal zero. Otherwise stated, $\phi_1 + \phi_2 = 0$, or $\phi_1 = -\phi_2$. This equation states that if there is a random phase variation $\phi_1$ in the circuit I there will be an equal and opposite phase variation, $\phi_2$ in the circuit II. If there is a random phase variation, it will introduce an error in the frequency reading corresponding to the temperature to be sensed and therefore must be taken into account. Random phase variation may be represented by the following equation:

$$\tan \phi = -\frac{2Q \Delta f}{f_o}$$

where $\phi$ represents the random phase variation in radians
$Q$ represents the Q of the feedback path
$\Delta f$ represents a variation in frequency due to the random phase variation
$f_o$ represents the resonant frequency of oscillation.

Rearranging the above equation, $$f\Delta = -\frac{f_o \tan \phi}{2Q}$$

and it may be seen from this equation that the frequency variance $\Delta f$ as a result of a random phase variation $\phi$ at a frequency of oscillation $f_o$ is inversely proportional to the Q of the feedback path. It may be seen that the higher the Q, the less will be the frequency variation. By way of example, and with reference to FIG. 4, a situation will be considered wherein the resonator 10 is used in a temperature sensing circuit in which there is a random phase variation of 10° and the frequency of oscillation is 36 kilohertz (kHz.). Since there is no or little vibratory energy transmitted through the support means of the resonator 10, extremely high Q resonators may be utilized, and in the present example a resonator having a Q of 50,000 will serve as an example.

In the absence of any random phase variation, any variation in the frequency of the oscillator circuit would represent solely a change in temperature. Since this situation is virtually impossible, the frequency provided by the oscillator includes a frequency variation due to a random phase variation, and in the present example is as follows:

$\phi$ = random phase variation = 10°
$f_o$ = 36 kHz.
$Q$ = 50,000

$$\Delta f = -\frac{f_o \tan \phi}{2Q}$$

$$\Delta f = -\frac{36,000 \times .176}{2 \times 50,000}$$

$$\Delta f = -.063 \text{ Hz.}$$

assuming an aluminum disk 12, the frequency-temperature coefficient of aluminum at 0° C. is approximately −300 parts per million per degree centigrade operating at a frequency of 36 kHz.:

$$\frac{-300}{10^6 \text{ C.°}} \text{ (p.p.m./°C.)} \times 36 \times 10^3 \text{(kHz.)} = -10.8 \text{ Hz./°C.}$$

which states that for every degree change, the resonator 10 will change its operating frequency 10.8 cycles. In the stated example however, a frequency change of −.063 Hz will be due to a random phase variation, the accuracy of the system therefore being:

$$\frac{-.063}{-10.8} = .0068$$

Otherwise stated, operating at a frequency of 36 kilohertz with a random phase variation of 10° with a resonator having a Q of 50,000, a frequency reading corresponding to a temperature may be in error by .0068° C. The accurate sensing means of the present invention may be made even more accurate by employing a resonator having a higher Q, the Q being a function of the dimensions, accurate machining and material of the resonator 10. The high Q resonator 10 may be additionally utilized in circuits wherein the phase variation is greater than 10° wherein satisfactory results will be obtained. Although the present invention is well suited for temperature measurements of various environments, it is particularly well adapted for oceanographic temperature measurements wherein the temperature in many scientific experiments must be accurately known to within one hundredth of a degree, and to this end reference is now made to FIG. 6.

Figure 6:
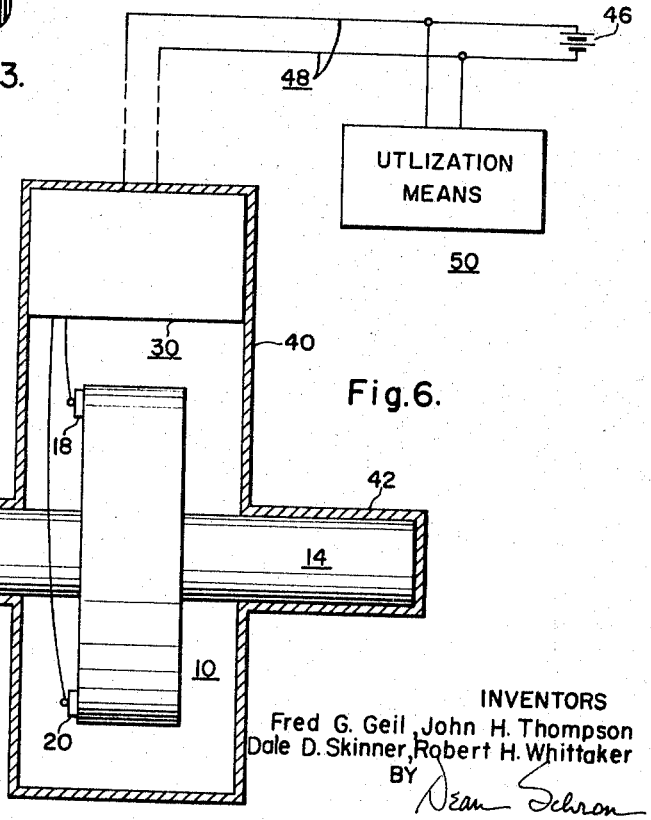
FIG. 6 illustrates a schematic showing of an in situ temperature sensor.

FIG. 6 illustrates a schematic showing of an in situ temperature sensor. In FIG. 6 there is shown the resonator 10 mounted within a container 40 which is preferably of a high heat conductive material such as brass. In order to prevent an air atmosphere from loading the disk 12 of the resonator 10 the container 40 is preferably evacuated. The post 14, being the heat exchange medium with the disk 12 of the resonator 10, is set into an extension 42 of the container 40 and is in good heat exchange relationship therewith. In order to provide a faster response time, the post 15 which is an additional heat transfer medium may be set into projection 42' of the container 40. The amplifier means 32 and attendant circuitry, designated by the numeral 30, may be in a potted state within the container 40. D.C. power for the oscillator circuit is provided by a D.C. source 46 supplying power to the oscillator means along first and second lead lines 48. These two same lines may be ulitized to convey the frequency signal from the oscillator means 30 to utilization means 50 which may be frequency responsive means for telemetry operations, or a counter which will count the frequency of oscillation to thereby provide a digital signal. Since frequency is being measured, the IR drop in the lines 48 does not impair the operation of the temperature sensing apparatus and consequently the apparatus may be utilized to measure ocean temperatures with the power supply and utilization means located at a distance well over ten miles from the container 40.

Accordingly, there has been provided temperature sensing apparatus which eliminates the need for constant calibration and will provide accurate temperature readings to within one hundredth, or even several thousandths of a degree centigrade.

Although the present invention has been described with a certain degree of particularity, it should be understood that the present disclosure has been made by way of example and that modifications and variations of the present invention are made possible in the light of the above teachings.

What is claimed is:
1. A temperature sensor comprising:
  a high heat conductive flexural mode disk resonator capable of oscillation at a predetermined frequency and having a frequency temperature coefficient such that said predetermined frequency changes with the change in temperature; and
  high heat conductive support means integral with and forming a substantially lossless bond with said resonator.
2. A temperature sensor comprising:
  a high heat conductive flexural mode resonator having at least two nodal diameters and capable of oscillation at a predetermined frequency and having a frequency temperature coefficient such that said predetermined frequency changes with the change in temperature;
  at least one support post integral with and forming a substantially lossless bond with said resonator at the intersection of said two nodal diameters;
  said support posts being of a high heat conductive materal so as to be into heat transfer relationship with said resonator.
3. Temperature sensing apparatus comprising:
  a temperature sensitive flexural mode resonator having at least two nodal diameters and capable of oscillating at a fundamental frequency in addition to a plurality of other frequencies;
  oscillator means including a feedback path;
  said resonator operatively connected in said feedback path to govern the frequency of said oscillator means;
  filter means associated with said oscillator means for passing only frequencies below a predetermined cut-off point to insure that said resonator oscillates at said fundamental frequency; and
  heat exchange means integral with and forming a substantially lossless bond with said resonator.
4. A temperature sensor comprising:
  a temperature sensitive flexural mode resonator including at least two nodal diameters;
  at least one support post in heat exchange relationship with said resonator at the intersection of said two nodal diameters, said support post being integral with, and forming a substantially lossless bond with said resonator;
  oscillator means including a feedback loop;
  said resonator operatively connected in said feedback loop to control the frequency of oscillation of said oscillator means; and
  at least one said support post adapted to be placed in an environment to be in heat exchange relationship therewith.
5. Temperature sensing apparatus comprising:
  a metallic flexural mode resonator having at least two nodal diameters and including a drive element for placing said resonator into oscillation and a pickup element for sensing said oscillation;
  at least one support post integral with said resonator at the intersection of said two nodal diameters and forming a lossless bond with said resonator;
  said support post being operatively connected to ground potential such that said resonator forms a three terminal network with said support post adapted to be placed in an environment such that it is in heat exchange relationship therewith; and
  oscillator means having an input and an output, with said output connected to said drive element and said input connected to said pickup element of said resonator.
6. Temperature sensing apparatus comprising:
  a heat conducting evacuated container;
  said evacuated container including therein a flexural mode resonator having two nodal diameters, support means integral with said resonator at the intersection of said nodal diameters, oscillator means including said resonator in a feedback path of said oscillator means, such that the frequency of said oscillator means is governed by said resonator;
  said resonator being mounted in said heat conducting evacuated container such that said support means is in heat exchange relationship with said container.
7. A temperature sensor comprising:
  a flexural mode resonator including at least two nodal diameters;
  oscillator means including a feedback loop;
  said resonator operatively connected in said feedback loop such that the frequency of oscillation of said oscillator means is determined by said resonator; and
  heat exchange means integral with and forming a substantially lossless bond with said resonator.

(References on following page)

References Cited by the Examiner

UNITED STATES PATENTS

| | | | |
|---|---|---|---|
| 1,962,609 | 6/1934 | Nicolson | 331—154 |
| 1,990,085 | 2/1935 | Mudge et al. | 73—67.2 |
| 2,486,984 | 11/1949 | Rowe | 73—67.2 |
| 2,504,719 | 4/1950 | Neilson | 331—154 X |
| 2,750,794 | 6/1956 | Downs | 73—362 X |
| 2,759,102 | 8/1956 | Burns | 331—154 X |
| 2,800,647 | 7/1957 | Baerwald | 73—67.2 X |
| 3,153,338 | 10/1964 | Kleesattel | 73—67.1 |
| 3,186,226 | 6/1965 | Nilnes et al. | 73—339 |

OTHER REFERENCES

Arthur L. Kimball's College Textbook of Physics, N.Y., Henry Hott and Company, Inc., 1954, revised by Alan T. Waterman, Chapter 17, page 299.

LOUIS R. PRINCE, *Primary Examiner.*

D. M. YASICH, *Assistant Examiner.*